(12) United States Patent
Owen

(10) Patent No.: US 6,529,873 B1
(45) Date of Patent: Mar. 4, 2003

(54) APPARATUS AND METHOD FOR PROVIDING AND UPDATING RECORDED AUDIO MESSAGES FOR TELECOMMUNICATION SYSTEMS

(75) Inventor: Creston M. Owen, Catlett, VA (US)

(73) Assignee: Focuspoint, Inc., Manassas, VA (US)

( * ) Notice: Subject to any disclaimer, the term of this patent is extended or adjusted under 35 U.S.C. 154(b) by 0 days.

(21) Appl. No.: 09/571,660

(22) Filed: May 15, 2000

(51) Int. Cl.⁷ .......................... G10L 13/08; G10L 21/00; G06F 17/60
(52) U.S. Cl. .................. 704/260; 704/260; 704/270; 705/26
(58) Field of Search .................. 704/260, 270, 704/270.1, 275; 705/14, 64, 26; 709/226

(56) References Cited

U.S. PATENT DOCUMENTS

| | | | |
|---|---|---|---|
| 4,124,773 A | * | 11/1978 | Elkins |
| 5,640,590 A | * | 6/1997 | Luther ............... 707/500.1 |
| 5,710,887 A | * | 1/1998 | Chelliah et al. ........... 345/835 |
| 5,933,811 A | * | 8/1999 | Angles et al. ............. 705/14 |
| 6,055,566 A | * | 4/2000 | Kikinis ............... 709/218 |
| 6,067,566 A | | 5/2000 | Moline |
| 6,088,455 A | | 7/2000 | Logan et al. |
| 6,161,092 A | | 12/2000 | Latshaw et al. |
| 6,185,573 B1 | * | 2/2001 | Angelucci et al. ............. 705/1 |
| 6,226,618 B1 | | 5/2001 | Downs et al. |

FOREIGN PATENT DOCUMENTS

WO  WO 01/89178 A3  11/2001

* cited by examiner

*Primary Examiner*—Marsha D. Banks-Harold
*Assistant Examiner*—V. Paul Harper
(74) *Attorney, Agent, or Firm*—Fulbright & Jaworksi, LLP (57) ABSTRACT

A method and system for, effecting production, approval and downloading of audio programs via the Internet. An order for an audio program is placed by a customer using a personal computer connected by the Internet to a server system. The server system receives the customer order and sends to the customer options for preparing a script and selecting music types that are to be dubbed into the audio program. A draft audio program is prepared by a service provider and downloaded to the server system. The customer accesses the server system and previews the draft audio program. If the customer wants the draft audio program changed, the customer inputs the changes to the server system. A redrafted audio program is prepared and loaded on the server system. This process is repeated until the customer approves an audio program for downloading to a memory device for later reproduction.

4 Claims, 6 Drawing Sheets

APPARATUS AND METHOD FOR PROVIDING AND UPDATING RECORDED AUDIO MESSAGES FOR TELECOMMUNICATION SYSTEMS

BACKGROUND OF THE INVENTION

1. Field of the Invention

The present invention relates in general to the field of providing recorded audio messages for telecommunications, systems and, more particularly, to apparatuses and methods using the Internet to remotely order, create, edit, review, approve and download audio messages to be recorded for reproduction.

2. Discussion of the Prior Art

The first installed telephone systems had single lines provided to separate locations. Even in the case of business establishments, such single-line installations were the normal practice, when telephone systems were first being installed, despite the fact that only one incoming call could be received at a time, or alternatively, only one outgoing call could be made at a time using a single line. In the case of home telephone installations such single-line arrangements, even today, have been found predominately adequate. Now, homeowners, though, are beginning to have more lines installed as different types of telecommunications equipment beyond telephones, e.g., telecopy machines and modem equipped computers, are being installed and operated in their homes.

Despite the many decades through which single telephone line installations in homes were found adequate, such single-line installations for businesses were found early on to be inadequate. Beginning early in the history of telephone service, as more telephones were installed in homes and businesses, the numbers of incoming and outgoing calls to and from businesses proportionately increased. Unavoidably, as business telephone call traffic increased, those that were trying to reach businesses would often encounter busy lines, and, therefore, the caller would have to hang up and try to call later, or not call back at all, which raised the possibility of lost business. To avoid losing customers, businesses found it necessary to have multiple lines installed to their offices as more and more of those businesses increased the volume of business transacted by telephone.

In actuality, the installation of multiple lines only provided a partial solution of the problem; namely, it addressed the problem of technically being able to have multiple telephone conversations at the same time from one location. However, installation of multiple lines alone is not a complete solution because the early rudimentary telephone systems involved each line terminating with a separate telephone and that telephone being connectable to other system telephones by a separate designated circuit, i.e., telephone number. These consequences of multiple lines—namely separate multiple telephones and associated telephone numbers—unavoidably result in, at the very least, inefficiencies for the affected businesses. Ideally each business wants to have only one telephone number that customers have to remember and use to conduct business with that company, and businesses do not necessarily need each line to terminate with a different telephone set.

The solution that was developed to overcome these problems is a specialized switching system, installed at the business locations, that takes multiple outside lines as inputs and outputs a single line to a connected telephone or outputs a number of lines to a corresponding number of telephones. The switching system, which in its early embodiments utilized electromechanical technology, connects one outside line at a time to a connected telephone, and, depending on the order in which incoming calls are received, assigns each call to the next available line using a method called a hunt group, i.e., a roll-over process. Such a switching system installed at a business with multiple input outside lines, which is called a key service unit, enables that business to have one telephone number and to thereby simultaneously receive as many incoming calls as there are lines provided to the key service unit without a caller encountering a busy signal. Of course someone using a telephone connected to a key service unit could use one of those outside lines that is not being used for a previously made incoming call to make an outgoing call.

With the rapid acceptance and utilization of telephones that occurred in the business world, it did not take long for key service units to be installed for use by at least the number of telephones as there were occupied offices at a business location. Businesses further adopted systems whereby one of the telephones connected to the key service unit would, during business hours, be operated by a receptionist who would answer every incoming call and either connect a caller to a telephone on which a company employee could have a conversation with the caller or connect the caller to a shunt circuit, which became known as a music-on-hold ("MOH") port or circuit. Such receptionist based systems essentially became the standard for businesses and still are widely used, though the receptionist function, for many business installations, now has been automated.

Being able to essentially immediately inform a caller that her call has reached the correct business and that someone knows her call has been connected to a MOH circuit are effective steps that a business having a key service unit with multiple outside lines can take to assure customers that their calls are important to the business. However, as the volume of business conducted by telephone and the pace at which customers expect to have their business attended to have increased, it has become recognized as an imprudent business practice merely to connect customers to essentially silent MOH circuits that do not provide continuous audio feedback. A basis for this recognition is a general belief that about 60 percent of callers who are connected to a MOH circuit for more than about one minute, will hang up, and of those callers who do hang up, about a third will not call back. Businesses attempt to avert losing customers who cannot immediately be connected to an employee for a conversation by having systems installed that continuously reproduce audio programs that are connected to their key service unit MOH circuits. Initially, the programs were music, without spoken dialog, that were intended to entertain customers while connected to the MOH circuits. Subsequently, audio programs were modified to include periodic verbal messages such as "Your business is important to us. Please wait and the next available attendant will answer your call." Such messages are intended to placate customers as they become anxious that their calls are not being answered more quickly.

Since at least the early, 1980's, tape players or other similar electronic audio signal reproduction equipment have been used for providing audio programs to key service unit MOH circuits. Under commonly practiced arrangements for using such electronic systems, businesses contract with organizations who employ, for example, radio disc jockeys, or the businesses directly contract with disc jockeys themselves, to record spoken text along with background music on tapes so that the recorded audio programs can be reproduced and input to MOH circuits. Unavoidable problems that plague such arrangements include (1) the limited durability of the media on which produced audio programs may be recorded such as tapes; (2) the time required to pass information back and forth between a business and a producer to prepare a new audio program along with the unavoidable potential errors in both transmitting and receiving information used to create and edit audio programs; and (3) then the logistic delays in delivering audio recordings to business locations where players and key service units are installed.

Now, key service units are digitized and can have digital players connected to the MOH circuits. Dynamic random access memory (DRAM) circuits can be used in such digital players for reproducing prerecorded audio programs, and these digital players can either be included within the physical box containing key service unit electronics or they can be devices physically separated from the key service units with interconnections made to the key service unit MOH circuit jacks. Use of physically durable memory devices such as solid state DRAM semiconductor circuits address the prior problems of recording media durability, but all the other deficiencies of the prior systems are still unaddressed.

Figure 1:
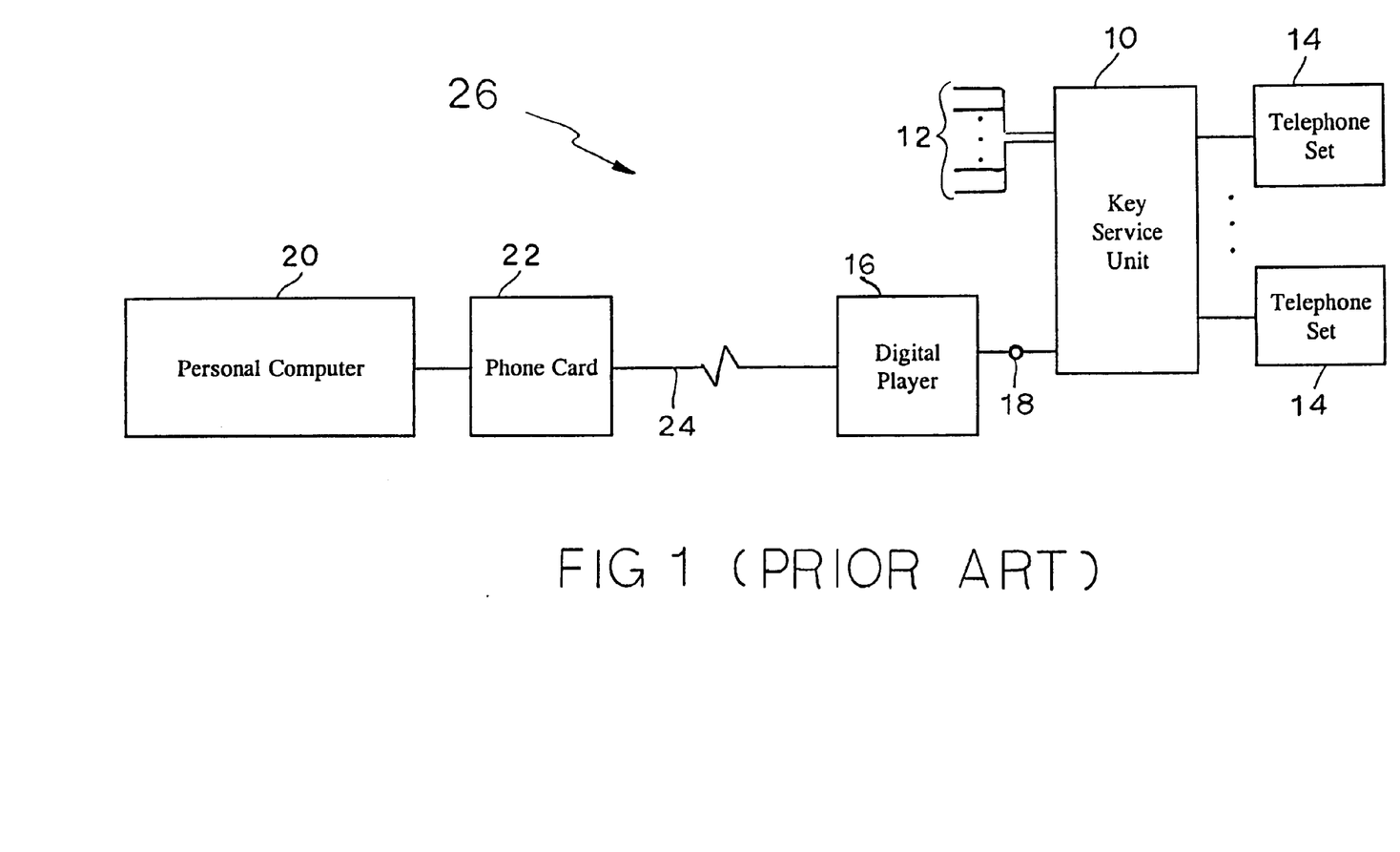
FIG. 1 is a block diagram showing a prior art system capable of recording audio programs for reproduction through key service units.

An example of a digitized key service unit system is shown in FIG. 1, where a key service unit 10, e.g., a Comdial J1632 Rev. L Digital/Key Service Unit as sold by Comdial Corp., Charlottesville, Va., is installed at a business location and is connected to multiple outside telephone lines 12. Multiple telephone sets 14 are connectable to the outside lines 12 through the key service unit 10. For this particular example, a digital player 16 is not physically incorporated as part of the key service unit 10, but instead, is shown in block fashion as being electrically connected to the key service unit 10 at a MOH jack 18.

As with magnetic tapes, compact discs or other electronic recording media, the DRAMs used in digital players 16, such as the RU/RUF 2700 Series On-Hold Remote Unit sold by Premier Technologies, Inc., Long Lake, Minn., can be used to record electronic signals provided either from systems where the audio portions of live or substantially live performances are processed using microphones or from electronic circuits that produce electronic signals previously recorded for input to memory devices. Significantly, DRAM devices can be used to record and reproduce digital signals at data rates, i.e., bit rates, equal to or even far exceeding those that telephone lines are capable of transmitting, and therefore, the audio programs reproduced using semiconductor memory based systems can consist of signals that provide the best sound quality which telephone lines are capable of transmitting In fact, when DRAM based recording and reproduction systems are connected to telephone lines, it is the signal transmission limitations of telephone lines that are the restricting factors on the quality of reproduced audio programs. Since it is the telephone lines that restrict audio signal quality and not the DRAM circuits, and since callers are connected to key service units by telephone lines, it is not only feasible to use telephone lines to transmit audio program signals to DRAM circuits for recording, but such an arrangement essentially provides the best quality signal format for recording on a DRAM circuit that a key service unit could use to reproduce such signals to a caller connected to the key service unit. These facts have been recognized and relied on for a prior system where a personal computer (PC) 20, utilizing at least a 100 megahertz (MHz) processor and having at least a 16 megabit (MB) random access memory (RAM) capability, is connected via a phone card 22 capable of supporting 8 kilohertz (KHz) bit rate transmissions over telephone lines 24 to a connected digital player 16. Software usable to process and transmit audio program signals via the phone card 22 over the telephone line 24 for remotely activating and recording on the DRAM incorporated in the digital player 16 is loaded on PC 20. An example of such software is Premier's Studio Automation Software 9.5 for Windows® 95 that is made available under license from Premier Technologies, Inc., Long Lake, Minn.

The prior apparatus arrangement, including a PC 20, phone card 22, telephone line 24, digital player 16, connected via a MOH jack 18 to a key service unit 10 that interconnects multiple outside telephone lines 12 with telephone sets 14, as shown in FIG. 1 is generally designated by reference numeral 26.

To use the remote system 26, a business having an installed key service unit 10 could enter into an agreement, such as a contract, with a service provider who has access to a PC 20 on which is loaded appropriate software and which is also equipped with a phone card 22 to prepare audio programs for the business. The audio programs that the service provider would then prepare could be remotely recorded on the digital player 16 using a telephone line 24 hookup from the PC 20 with an associated phone card 22.

In concept, such a remote system 26 appears to be both an effective and an efficient arrangement. However, in practice, as with the installation's of multiple telephone lines to business locations, more than mere installation of the prior available equipment is required to realize efficiencies. True, the installation of the prior available equipment with loaded software included in remote system 26 provides for electronic delivery of recordable audio programs, but such capability alone fails to provide businesses with a system for effectively reliable ordering, creating, editing and approving audio programs on the tight schedules required to meet the urgent schedules of businesses. For example, businesses could require new audio programs to be produced and recorded on their digital players on schedules measured in periods as short as days, not weeks, as was acceptable in the past. The prior systems, such as remote system 26, address only one end of the process, i.e., remote recording, not the entire process of ordering, creating, editing, approving and also recording.

The unsatisfied needs arise predominantly from the types of communications methods available for use between businesses and service providers. Such communications methods may be utilized to link the business customer and service provider merely cross-town or across intercontinental distances, but irrespective of whatever are the involved geographic distances the communications must be reliable, timely and essentially always available in terms of both time and location in order, to meet the ever-increasing needs of modern businesses. The subject matter that must be communicated between businesses and service providers include both textual materials and audio formats, i.e., music and voice styles, the businesses want prepared for initial and follow-on audio programs. Previously available methods of communication that could be used ranged from express courier services (limited by at least the constraints of having to move paper or other physical objects (e.g., tapes, compact discs (CDs,) etc.)), telephones (limited by at least not having a permanent or semi-permanent record available of exactly what was communicated), telecopiers (limited by at least first having to produce paper copies), to e-mail (limited at least by being a non-interactive typographic communications system).

SUMMARY OF THE INVENTION

The Present invention provides a method and apparatus for a telecommunications remote recording audio program system (TRRAPS) that is used to provide efficient, effective and secure interactive communications between a business customer having an installed key service unit with a volatile memory device for recording and reproducing audio programs, such as a DRAM equipped digital player, and a service provider who produces audio programs that can be recorded on the digital player. TRRAPS uses the Internet to interconnect the computer and the volatile memory device, that for efficient reference will be labeled a digital player, with its associated key service unit that are all installed at a customer business location with an interconnected personal computer located at the place of business occupied by the service provider. A preferred embodiment of TRRAPS effects the Internet connection between the personal computers at the customer business and service provider locations through an Internet Web server on which software is loaded to provide a secure, interactive Web site for interconnecting the personal computers.

In use for an embodiment, a business customer using a personal computer would connect to the Internet and input a Hyper Text Transfer Protocol (http) incorporating an Uniform Resource Locator (URL) to call up the, TRRAPS Web site. To then access the TRRAPS Web site which is a site having secure Web pages and therefore may have an address prefaced with https instead of http, the business customer will need to enter a password that would be purchased by the business customer for that customer's exclusive use. The TRRAPS Web site operator would assign exclusive passwords to business customers at the times that the business customers pay for the TRRAPS service. After a business customer first accesses the TRRAPS Web site a cookie including the business customer name and password could be created and stored so that the next time the business customer calls up the TRRAPS Web site that information does not have to be again entered in order for the business customer to enter the TRRAPS Web site. In addition to being a secure interactive system, the TRRAPS Web site also interconnects the personal computer being used by the business customer with the personal computer at the service provider location. The business customer who has accessed the TRRAPS Web site can call up the Web page for ordering an intial or an updated audio program. For the situation where an initial audio program is being ordered, the business customer could link to a TRRAPS active Web page and call up a sample blank script that can be selected from a database of stored sample scripts that are categorized by business type, e.g., automotive sales, retail, healthcare, etc. After having selected and called up a sample blank script the business customer using the TRRAPS active Web page can complete, edit and identify the finalized script for linking to the service provider personal computer. In addition to selecting, completing and editing a sample blank script, the customer business employee also can select a type of music, e.g., classical, soft rock, etc. from a database of music selections accessible on another TRRAPS Web page.

Alternatively, the business customer can call up a form questionnaire that the business customer can complete and identify for linking to the service provider personal computer where the provided information would be used by the service provider to create a customized script for the business customer. The customized script then would be entered onto a TRRAPS Web site database with an identification for linking to the business customer personal computer so that the script can be reviewed, edited or approved for production by the business customer.

After an approved script has been loaded on the TRRAPS Web site and a selection or selections of music to be dubbed into an audio program have also been loaded on the TRRAPS Web site by the business customer, the service provider, using the input information, produces an audio program.

In one embodiment of TRRAPS the service provider, using facilities separate from the TRRAPS Web site, produces the approved requested audio program and loads the produced audio program on the TRRAPS Web site where the business customer can preview the produced audio program. Using the TRRAPS Web site the business customer and the service provider can then exchange further edits and audio program updates until the business customer approves the produced audio program and downloads the finalized audio, program onto a digital player.

In another embodiment of TRRAPS the business customer selects, in addition to a music type, a particular voice from a database of voices stored on the TRRAPS Web site. Then, the service provider, using the TRRAPS Web site, initiates a computerized text-to-speech process to translate the text of the approved script into a vocalized reading in the previously selected voice. After a vocalized reading is prepared the selected music is next dubbed into the vocalized reading by the service provider using additional software loaded on a TRRAPS active Web page. This produced audio program is then available on the TRRAPS Web site to be previewed by the business customer. When the business customer has approved a music dubbed audio program, the business customer downloads the approved music dubbed audio program onto a digital player.

BRIEF DESCRIPTION OF THE DRAWINGS

Corresponding components in the various figures of the appended drawings are either designated by the same numerals or, if different numerals are used, their relationship is identified in the text. The various objectives, advantages and novel features of the invention will become more readily apprehended from the following detailed description when taken in conjunction with the appended drawings, in which.

DETAILED DESCRIPTION OF PREFERRED EMBODIMENTS

Figure 2:
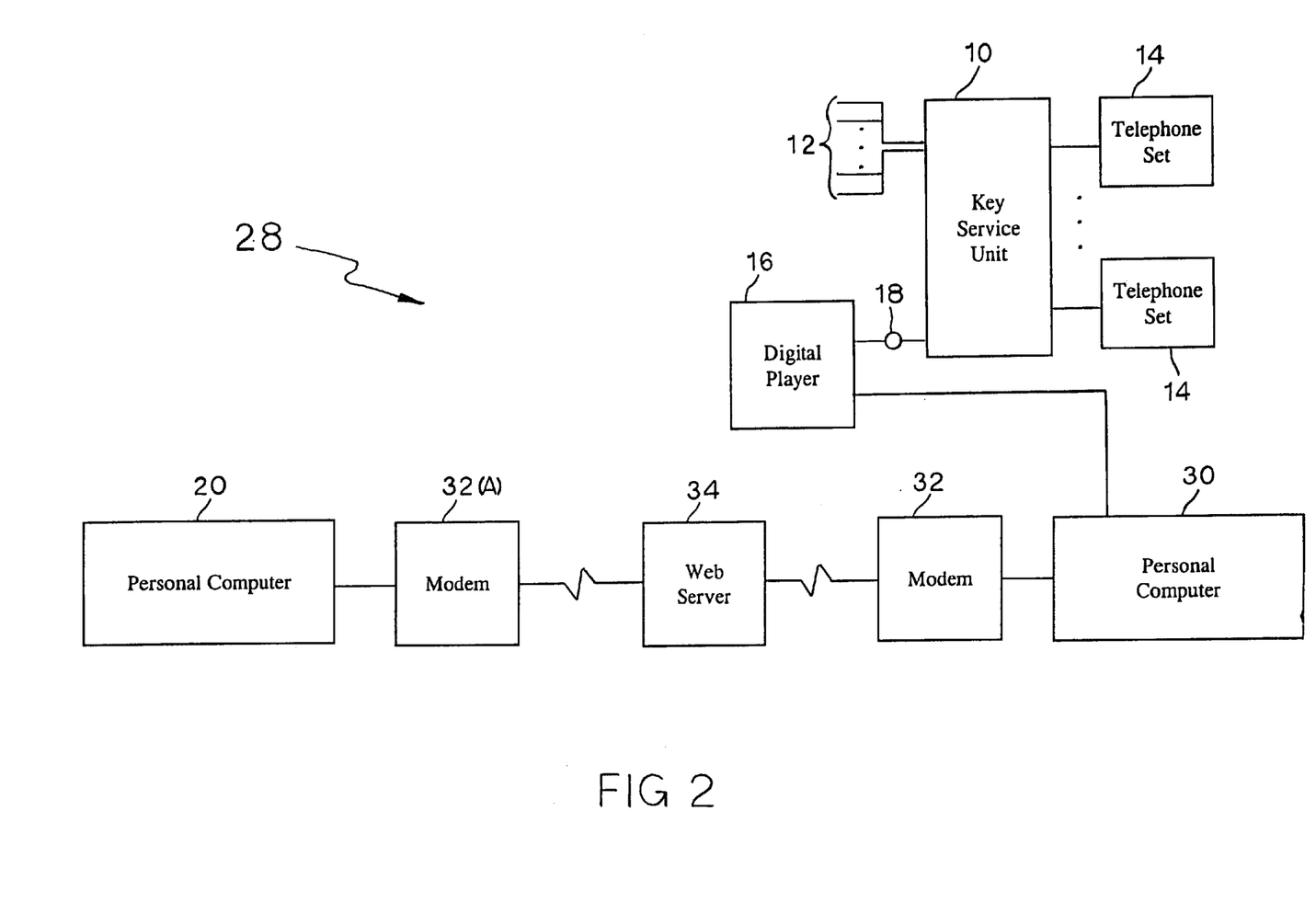
FIG. 2 is a block diagram showing an embodiment for a telecommunications remote recording audio program system (TRRAPS) including a Web server.

Referring to the drawings, a block diagram for an apparatus embodiment of the present invention to provide a telecommunications remote recording audio program system (TRRAPS), which is implemented as an Internet based system, is shown in FIG. 2, and this TRRAPS apparatus is generally designated by reference numeral 28. The TRRAPS 28 includes a digital player 16 that has a DRAM or other memory device which is capable of both recording and reproducing audio programs. Audio programs recorded on the digital player 16 can be reproduced for playback through a key service unit, 10 that interconnects outside telephone lines 12 with telephone sets 14. Specifically the reproduced audio programs are input to those outside telephone lines 12 that have been connected by the key service unit 10 to a MOH jack 18 which is also connected to the digital player 16. Both the key service unit 10 and the digital player 16 are installed at a TRRAPS customer location to facilitate having multiple outside telephone lines 12 interconnected to telephone sets 14, all of which are installed at the same business location.

A personal computer (PC) 30 is also located at the TRRAPS customer location utilizing at least a 100 MHz processor and having at least a 16 MB RAM capability. This PC 30 is connectable to the Internet through a modem 32.

The PC 30 and modem 32, at the TRRAPS customer location, are interconnected by a Web server 34 to a second modem 32(a) that is connected to a PC 20, also utilizing at least a 100 MHz processor and having at least a 16 MB RAM capability. The PC 20 and modem 32(a) are located at the place of business of a service provider who the TRRAPS customer engages to provide audio programs for recording on the digital player 16.

Figure 3A:
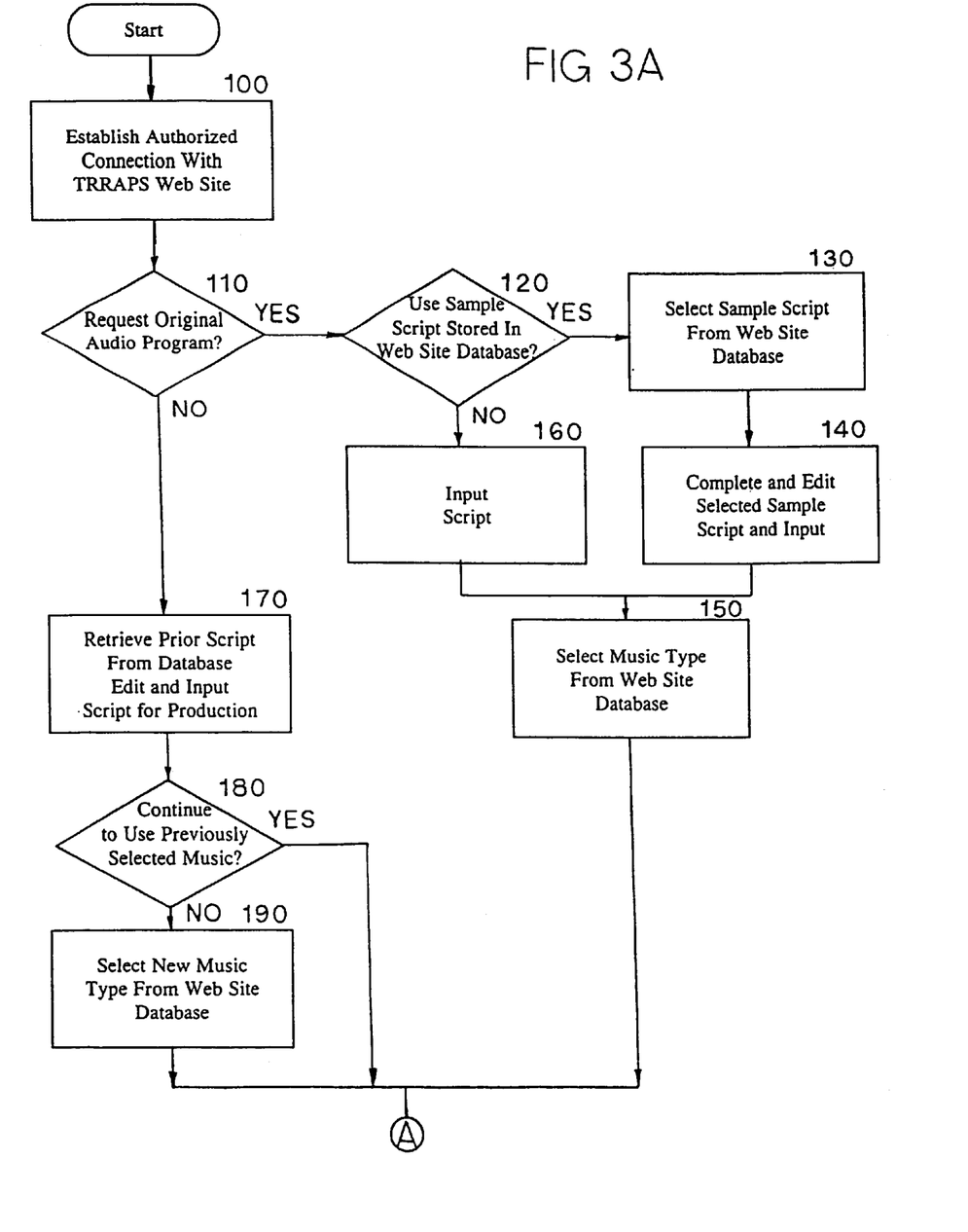
FIGS. 3A and 3B show flow charts depicting the steps for a TRRAPS Web site embodiment where a service provider produces audio programs apart from the TRRAPS Web site and loads the produced audio programs onto the TRRAPS Web site.
Figure 3B:
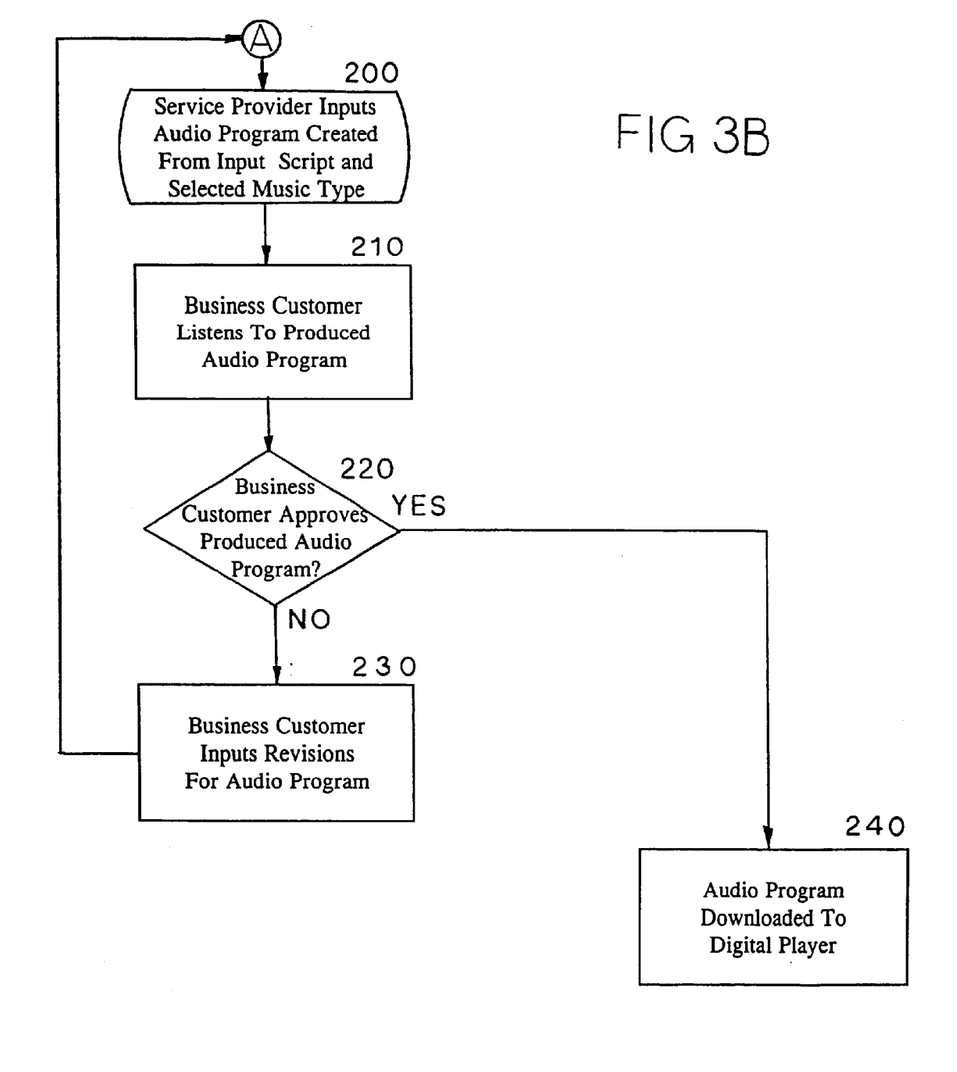

FIGS. 3A and 3B set out a flow diagram for a routine that enables implementation of a TRRAPS embodiment using a Web site. The routine set out in FIGS. 3A and 3B includes Web pages, which are documents that can be created using Hyper Text Markup Language (HTML).

To use the TRRAPS 28 which is implemented via a secure Web site, a TRRAPS customer accesses the Web server 34 using a http (or https) that includes a URL for a TRRAPS Web site, or the TRRAPS customer uses a different method such as a hyperlink from a Web page at a non-TRRAPS Web site to access the TRRAPS Web site. When a TRRAPS customer wishing to use the TRRAPS 28 has accessed the TRRAPS Web home page, that TRRAPS customer will be identified as an user authorized to have access to TRRAPS secure Web pages that are linked to the home page. Such identification is accomplishable by a first-time TRRAPS customer using prompts set out at the TRRAPS home page to purchase a password, and, thereby, purchase services available by using the TRRAPS 28. Assignment of a password includes payment of a service fee that, is chargeable via the TRRAPS Web site by entry of credit card information at the TRRAPS Web home page. Entry of an authorized password by a TRRAPS customer, either manually or via a cookie, in the case of existing TRRAPS customers, completes step 100 (see FIGS. 3A and 4A) to establish an authorized connection with the TRRAPS Web site.

After an authorized entry to the TRRAPS Web site a security restricted Web page is displayed on the monitor of PC 30 that includes an inquiry for the TRRAPS customer to answer as to whether or not the TRRAPS customer wants to make a request for an original, i.e., either a first or a never previously produced, audio program. Answering this inquiry at step 110 in the affirmative causes the TRRAPS Web site to display a second inquiry for the TRRAPS customer as to whether the TRRAPS customer wants to view and possibly use one of a selection of blank sample scripts stored in a database within the TRRAPS Web site. If the TRRAPS customer answers this inquiry at step 120 in the affirmative, a list of selections for blank sample scripts by business type, e.g., healthcare, banking and financial services, professional services, insurance, etc., will be displayed at step 130, and the TKRAPS customer can make a selection.

After making this selection the TRRAPS customer has the blank sample script displayed on the monitor of PC 30 as an interactive Web page that the TRRAPS customer can edit, complete with specific information and download to a TRRAPS database at step 140.

An alternative embodiment for step 130 includes a questionnaire the TRRAPS customer also can complete and download to a TRRAPS database at step 140. The questionnaire requests information from the TRRAPS customer such as business type, hours, years in business, etc., so that the service provider can draft a tailored script for that TRRAPS customer Upon entry to a TRRAPS database of the script edits and the provided information at step 140, the TRRAPS customer is prompted by the TRRAPS Web page displayed on the monitor of PC 30 at step 150 to select a music type for dubbing on the audio program to be produced from a variety of music types stored in a database within the TRRAPS Web site Back at step 120, if the TRRAPS customer selects not to use a blank sample script or a questionnaire stored in a TRRAPS Web site database, the TRRAPS customer at step 160 can input a script that the TRRAPS customer has written for the audio program being ordered. After inputting a script at step 160 the TRRAPS customer would be prompted by the TRRAPS Web site to select a music type at step 150 for dubbing into a produced audio program.

If after establishing an authorized connection with the TRRAPS Web site at step 100, the TRRAPS customer at step 110 inputs a negative response to the inquiry of whether the TRRAPS customer wants the service provider to create an original audio program, the TRRAPS customer will be enabled by the TRRAPS Web site at step 170 to access a secure database containing prior developed scripts or scripts that were used for producing prior audio programs for that TRRAPS customer. Every TRRAPS customer has its own secure database that cannot be accessed by others, including other TRRAPS customers, where prior scripts for that TRRAPS customer are stored. In order to access the particular prior script database for a TRKAPS customer, a TRRAPS 28 user would have to access the TRRAPS Web site with the unique password assigned to that TRRAPS customer. When the database for step 170 is accessed, the TRRAPS Web site displays on the monitor of PC 30 a list of all prior scripts stored in the database. The TRRAPS customer then selects one of the prior scripts which is displayed on the monitor of PC 30. That script can be edited at the interactive TRRAPS Web page or input without edits for production of the next audio program.

At this point, the TRRAPS customer is prompted at step 180 with a query as to whether the music type previously dubbed with the selected prior script is to be used for the new production. If the answer is no, then the TRRAPS Web site prompts the TRRAPS customer to select a new music type from those stored in the TRRAPS music database at step 190.

At this point, in all instances except one, the TRRAPS customer has input an approved script and selected a music type for an audio program to be produced. In the instance for which the TRRAPS customer has not input an approved script the TRRAPS customer has completed a questionnaire at step 140. Before an audio program can be produced in this instance a script must be written by the service provider and edited or approved by the TRRAPS customer. To facilitate procedures for production of audio programs, the service provider can post an anticipated time period such as a set number of hours, on the TRRAPS Web site by which the TRRAPS customer can reaccess the Web site and call up the script prepared and downloaded to the TRRAPS Web site by the service provider. The downloaded proposed script will be accessible by the TRRAPS customer on an interactive TRRAPS Web page. Using that interactive TRRAPS Web page the TRRAPS customer can approve the input script or edit it and then approve it for production of an audio program.

Now that an approved script and music selections have been entered into the TRRAPS Web site, the service provider produces an audio program using these input specifications. Production of the audio program is accomplished using known sound production and recording equipment and techniques. The final audio program is then downloaded on the TRRAPS Web site at step 200 (see FIG. 3B). Again the service provider can post an anticipated time on the TRRAPS Web site that will be required for production and downloading to the TRRAPS Web site of a proposed audio program, after which time, the TRRAPS customer can reaccess the TRRAPS Web site and download a portion or the entire proposed audio program onto PC 30 for previewing at step 210.

After downloading the proposed audio program the TRRAPS customer is queried at step 220 as to whether or not the proposed audio program is approved. If the TRRAPS customer does not approve the proposed audio program, the TRRAPS customer posts desired changes in text, music, composition, etc., on a TRRAPS interactive Web page at step 230. The service provider, using this information, produces an edited proposed audio program that is input to the TRRAPS Web site at step 200. The TRRAPS customer then repeats steps 210 and 220. This process is repeated until the TRRAPS customer approves an audio program at step 220, and directs downloading at step 240 of the approved audio program from PC 30 to digital player 16. The TRRAPS customer could also request that the approved audio program be downloaded from PC 20 to digital player 16 using a separate line.

For another embodiment of the present invention a TRRAPS Web, site set up with an interactive Web page where text-to-speech software is incorporated to further facilitate production of audio programs. Such text-to-speech software is exemplified by TextTalk licensed by Dialogic Corporation, Parsippany, N.J., and by, Naturally Speaking licensed by Dragon Systems, Inc. Newton, Mass. The text-to-speech routin for a TRRAPS 28 provides a database of different voices including female, male and famous voices (licensed as necessary). A set of flow charts for such a text-to-speech TRRAPS embodiment is set out. in FIGS. 4A and 4B.

Figure 4A:
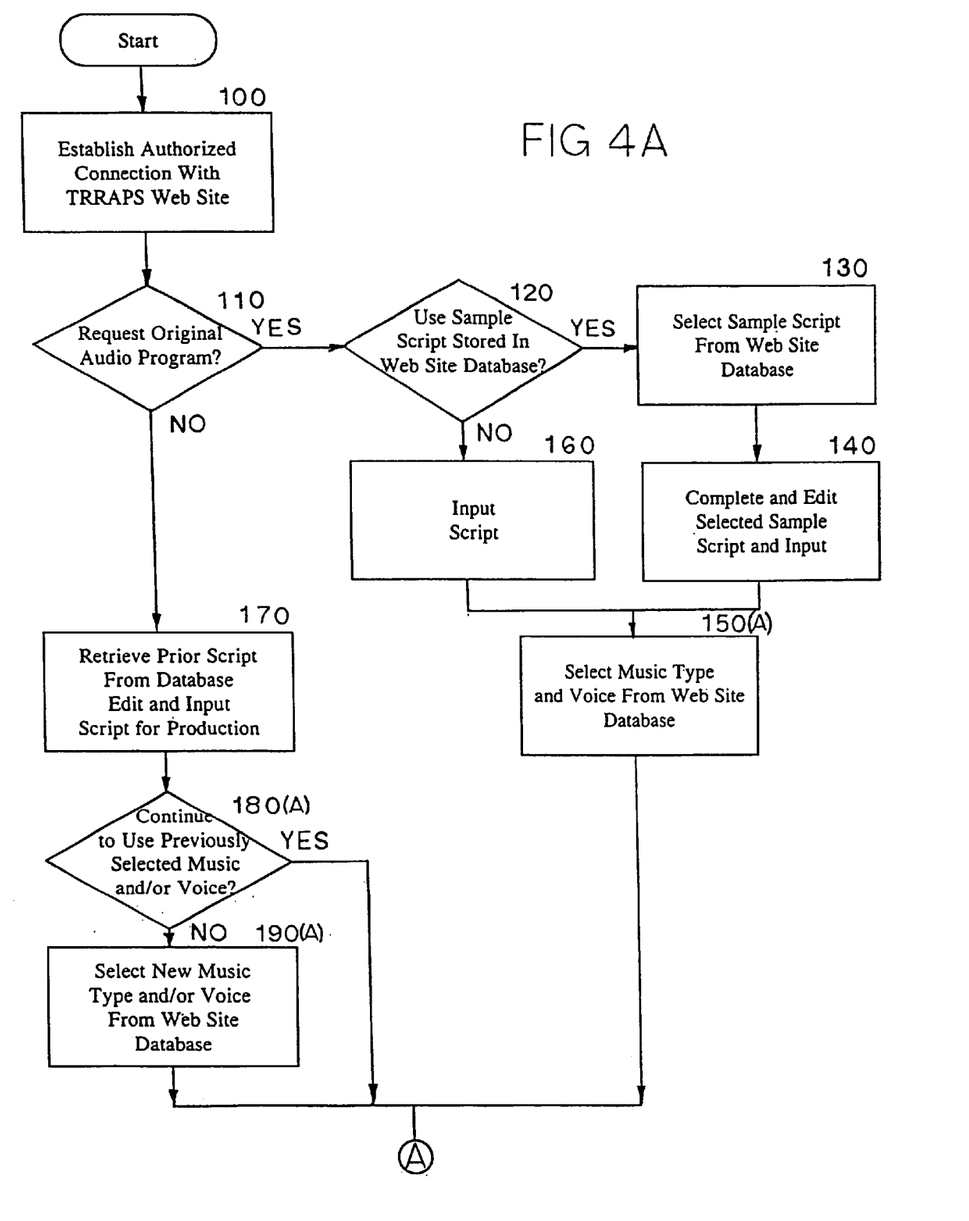
FIGS. 4A and 4B show flow charts depicting the steps for another TRRAPS Web site embodiment where a service provider, using the interactive TRRAPS Web site, produces audio programs using text-to-speech software and music stored in databases that are incorporated as active TRRAPS Web pages.

All of steps 100 through 140, and 160 and 170 set out in FIG. 4A are identical to those set out in FIG. 3A and as described above. At steps 150(*a*), 180(*a*) and 190(*a*) shown in FIG. 4A, the TRRAPS customer is either queried as to whether previously selected music type and/or voice selections are to be used in a new production (step, 180(*a*)), or the TRRAPS customer is prompted to select a used type and voice from databases, stored at the TRRAPS Web site.

Figure 4B:
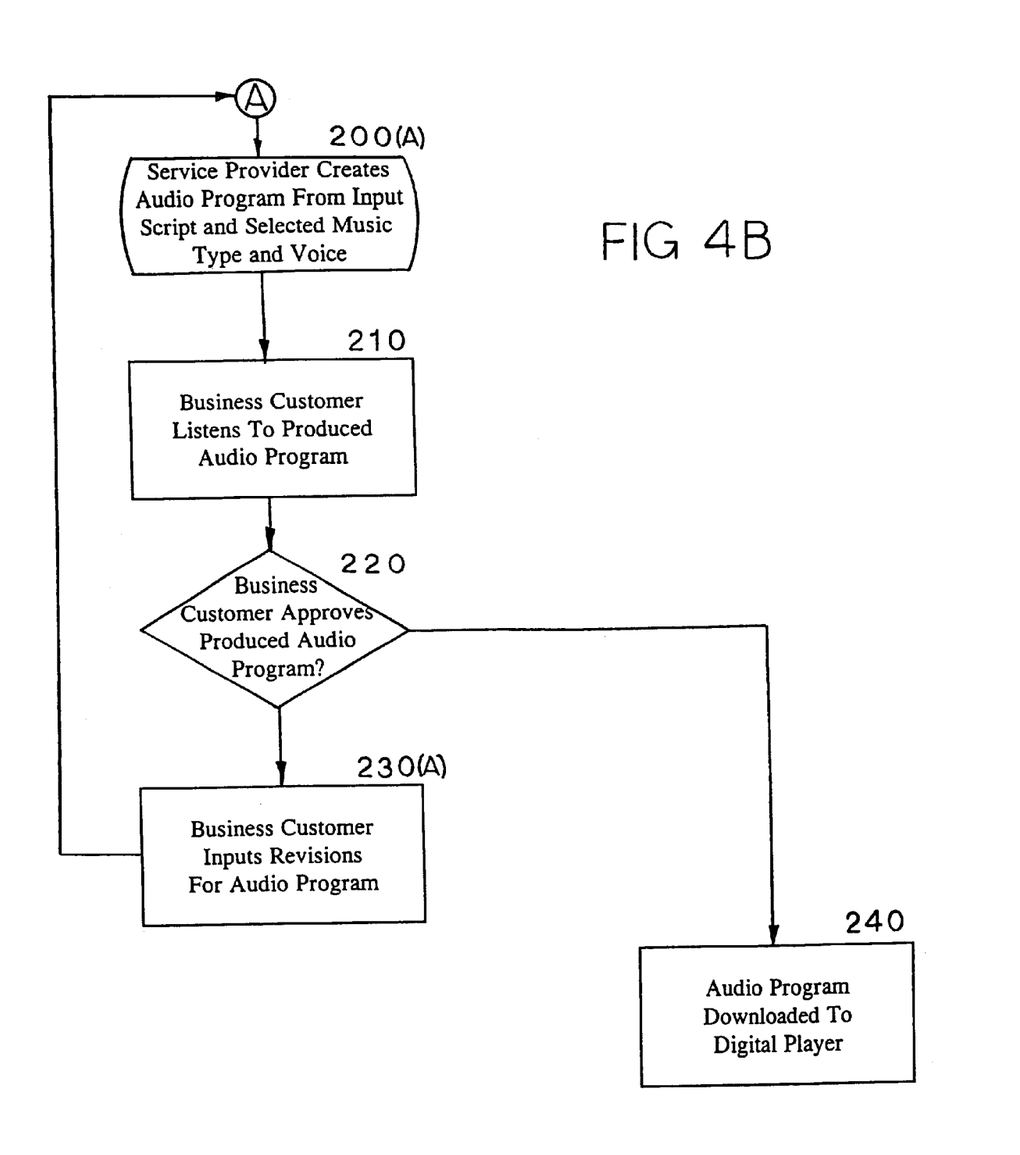

As shown in FIG. 4B for this embodiment, the service provider at step 200(*a*) creates a proposed audio program using the input script, music type and voice selections made by the TRRAPS customer. Then steps 210 and 220 again are the same for this embodiment as that shown in FIG. 3B. If the response to query step 220 is no, however, the TRRAPS customer could at step 230(*a*) (shown in FIG. 4B) modify the voice selection for the revised audio program. Upon final approval by the TRRAPS customer of the audio program at step 220 the approved audio program is downloaded from either PC 30 or PC 20 to digital player 16 using step 240. In another embodiment for a text-to-speech TRRAPS Web site, the TRRAPS customer is prompted to use the text-to-speech software and other production software loaded on the TRRAPS Web site to produce an audio program at a step (not shown). For such an embodiment the TRRAPS customer iterates through as many productions as are required until an acceptable program is produced. When an acceptable audio program is produced the TRRAPS customer directs downloading of the program to a digital player 16.

Although the present invention has been described in terms of various embodiments, it is not intended that the invention be limited to these embodiments. Modifications within the spirit of the invention will be apparent to those skilled in the art. For example, instead of using a key service unit hard-wired to telephone sets, the key service unit could additionally include a transmitter sending signals to remote receivers with speakers for reproduction of audio programs at gasoline pumps, or at different locations in retail establishments. Instead of recording audio programs on digital players connected to MOH jacks, the audio programs could be recorded on voice message circuits that may even include in personal computer systems that are interconnected to key service units.

The scope of the present invention is defined by the claims that follow.

What is claimed is:

1. A method for ordering, approving and downloading an audio program for playback to telephone users, comprising:

a customer accessing an Internet Website;

the customer ordering production of an audio program at the Website;

the customer inputting data for a script to be prepared for the audio program by a service provider;

the service provider preparing a proposed audio program using the input data for the script and storing the proposed audio program;

the customer accessing and evaluating the stored proposed audio program;

the customer being capable of requesting that changes be made to the proposed audio program by the service provider; and the customer approving an accepted audio program and ordering downloading of the accepted audio program to a recording device controlled by a key service unit for playback of the accepted audio program.

2. The method of claim 1 wherein the service provider uses artificial text-to-speech means for preparing a proposed audio program using the stored script and storing the proposed audio program.

3. A method for ordering, approving and downloading an audio program comprising:

a customer accessing an Internet Website;

the customer ordering preparation of a script by a service provider for production of an audio program by the service provider;

the service provider preparing a proposed script for the audio program and storing the proposed script;

the customer retrieving and reviewing the stored proposed script;

the customer being capable of requesting that changes be made to the proposed script by the service provider and the customer approving an accepted script that is stored by the service provider;

the service provider preparing a proposed audio program using the stored accepted script and storing the proposed audio program;

the customer retrieving and reviewing the stored proposed audio program;

the customer being capable of requesting that changes be made to the proposed audio program by the service provider; and the customer approving an accepted audio program that is stored by the service provider for downloading to a recording device capable of reproducing the downloaded audio program.

4. The method of claim 3 wherein the service provider uses artificial text-to-speech means for preparing a proposed audio program using the stored script and storing the proposed audio program.

* * * * *